United States Patent
Peterson et al.

(10) Patent No.: US 10,014,573 B2
(45) Date of Patent: Jul. 3, 2018

(54) DIRECTIONAL ANTENNA FOR WIRELESS MOTOR CONNECTION

(71) Applicant: NIDEC MOTOR CORPORATION, St. Louis, MO (US)

(72) Inventors: Gregory A. Peterson, South Barrington, IL (US); James W. Ensinger, Buffalo Grove, IL (US)

(73) Assignee: Nidec Motor Corporation, St. Louis, MO (US)

(*) Notice: Subject to any disclaimer, the term of this patent is extended or adjusted under 35 U.S.C. 154(b) by 89 days.

(21) Appl. No.: 15/342,843

(22) Filed: Nov. 3, 2016

(65) Prior Publication Data
US 2018/0123231 A1   May 3, 2018

(51) Int. Cl.
| | |
|---|---|
| H01Q 1/00 | (2006.01) |
| H01Q 1/46 | (2006.01) |
| H02K 11/30 | (2016.01) |
| H01Q 1/50 | (2006.01) |
| H01Q 1/38 | (2006.01) |
| H01Q 1/22 | (2006.01) |

(52) U.S. Cl.
CPC ............. *H01Q 1/46* (2013.01); *H01Q 1/2291* (2013.01); *H01Q 1/38* (2013.01); *H01Q 1/50* (2013.01); *H02K 11/30* (2016.01)

(58) Field of Classification Search
CPC .......... H01Q 1/46; H01Q 1/38; H01Q 1/2291; H01Q 1/50; H01Q 1/00
USPC ........................................................ 343/720
See application file for complete search history.

(56) References Cited

U.S. PATENT DOCUMENTS

| 7,592,957 B2* | 9/2009 | Achour ................... H01Q 1/38 343/700 MS |
| 8,368,595 B2* | 2/2013 | Lee ........................ H01Q 1/40 343/700 MS |

(Continued)

FOREIGN PATENT DOCUMENTS

JP          3946955          7/2007

OTHER PUBLICATIONS

PCT International Search Report and Written Opinion from PCT Application No. PCT/US2017/054525 entitled Directional Antenna for Wireless Motor Connection (dated Jan. 17, 2018).

(Continued)

*Primary Examiner* — Huedung Mancuso
(74) *Attorney, Agent, or Firm* — Hovey Williams LLP

(57) ABSTRACT

An antenna assembly comprises a substrate, an impedance matching network, and a driven antenna element. The substrate includes an insulating layer and a first electrically conductive layer disposed on a top surface of the insulating layer. The impedance matching network includes a balun, a first resistor, and a second resistor. The balun converts unbalanced signals to balanced signals and vice-versa. The first and second resistors are electrically connected to the balun. The driven antenna element is formed from the first electrically conductive layer and disposed on the top surface of the insulating layer. The driven antenna element includes a body, a first arm, and a second arm with the first and second arms spaced apart from another, parallel to one another, and physically connected to opposing ends of the body. The first arm is electrically connected to the first resistor. The second arm is electrically connected to the second resistor.

17 Claims, 4 Drawing Sheets

(56) References Cited

U.S. PATENT DOCUMENTS

| | | | |
|---|---|---|---|
| 8,556,178 B2* | 10/2013 | Wang | H01Q 1/2216 |
| | | | 235/439 |
| 8,610,635 B2 | 12/2013 | Huang et al. | |
| 2007/0176827 A1* | 8/2007 | Itoh | H01Q 13/206 |
| | | | 343/700 MS |
| 2010/0045554 A1* | 2/2010 | Xu | H01Q 15/0086 |
| | | | 343/753 |
| 2013/0069835 A1 | 3/2013 | Swais et al. | |
| 2014/0079564 A1 | 3/2014 | Becerra et al. | |
| 2015/0123864 A1 | 5/2015 | Boryssenko | |

OTHER PUBLICATIONS 2.4 GHz FlexNotch Antenna, 100mm Datasheet; Copyright 2014-2016 LSR.

* cited by examiner

DIRECTIONAL ANTENNA FOR WIRELESS MOTOR CONNECTION

BACKGROUND OF THE INVENTION

Field of the Invention

Embodiments of the current invention relate to antenna assemblies for appliances and similar devices.

Description of the Related Art

Electric motors that are utilized in appliances, such as washing machines and clothes dryers, typically include electronic control circuitry to control operating or performance parameters. Certain operating parameters, such as speed profiles, etc., may be programmable to increase the versatility of the motor. For example, the same type of electric motor may be used in both a washer and a dryer, but each motor may be programmed to operate with a different speed profile. In addition, each speed profile may need to be updated as changes in performance are required. The electronic control circuitry may be retained within a housing that also houses the electric motor.

The electronic control circuitry may be programmed wirelessly in order to avoid disassembly of the appliance whenever reconfiguration is needed. A whip antenna may be utilized for the wireless communication and is typically positioned on the exterior of the housing. In addition, an opening in the housing allows the electronic control circuitry to be connected to the antenna. Unfortunately, the antenna is often damaged as the motor is installed in the appliance. And, the opening in the housing exposes the electronic control circuitry and the motor itself to dust, dirt, and moisture.

SUMMARY OF THE INVENTION

Embodiments of the current invention solve the above-mentioned problems and provide a distinct advance in the art of antenna assemblies for appliances and other devices.

One embodiment of the invention is an antenna assembly comprising a substrate, an impedance matching network, and a driven antenna element. The substrate includes an insulating layer and a first electrically conductive layer disposed on a top surface of the insulating layer.

The impedance matching network is configured to match an electrical impedance between two impedance mismatched components and includes a balun, a first resistor, and a second resistor. The balun is configured to convert a first unbalanced signal to a first balanced signal and convert a second balanced signal to a second unbalanced signal. The balun includes a unbalanced port to communicate the first and second unbalanced signals and a balanced port to communicate the first and second balanced signals. The first resistor includes a first terminal and a second terminal with the first terminal electrically connected to a first terminal of the balanced port. The second resistor includes a first terminal and a second terminal with the first terminal electrically connected to a second terminal of the balanced port.

The driven antenna element is formed from the first electrically conductive layer and disposed on the top surface of the insulating layer. The driven antenna element includes a body, a first arm, and a second arm. The first and second arms are spaced apart from another, parallel to one another, and physically connected to opposing ends of the body. The first arm is electrically connected to the second terminal of the first resistor, and the second arm is electrically connected to the second terminal of the second resistor. The above-described antenna assembly is compact in size, may be positioned within a motor housing, and may operate in close proximity to metal components.

Another embodiment of the invention is an electric motor assembly comprising a housing, an electric motor, a motor controller, a wireless transceiver, and an antenna assembly. The housing includes at least one wall formed from metal. The electric motor is retained within the housing. The motor controller is configured to control the operation of the electric motor. The wireless transceiver module is configured to receive data from the motor controller and transmit the data in a first unbalanced signal and to receive data in a second unbalanced signal and transmit the data to the motor controller.

The antenna assembly includes a substrate, an impedance matching network, and a driven antenna element. The substrate includes an insulating layer and a first electrically conductive layer disposed on a top surface of the insulating layer. The impedance matching network is configured to match an electrical impedance between two impedance mismatched components. The impedance matching network includes a balun, a first resistor, and a second resistor. The balun is configured to convert the first unbalanced signal from the wireless transceiver module to a first balanced signal and convert a second balanced signal to the second unbalanced signal for the wireless transceiver module. The balun includes a unbalanced port to communicate the first and second unbalanced signals and a balanced port to communicate the first and second balanced signals. The first resistor includes a first terminal and a second terminal with the first terminal electrically connected to a first terminal of the balanced port. The second resistor includes a first terminal and a second terminal with the first terminal electrically connected to a second terminal of the balanced port. The driven antenna element is formed from the first electrically conductive layer and disposed on the top surface of the insulating layer. The driven antenna element is positioned in proximity to the at least one wall of the housing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figures 1, 2:
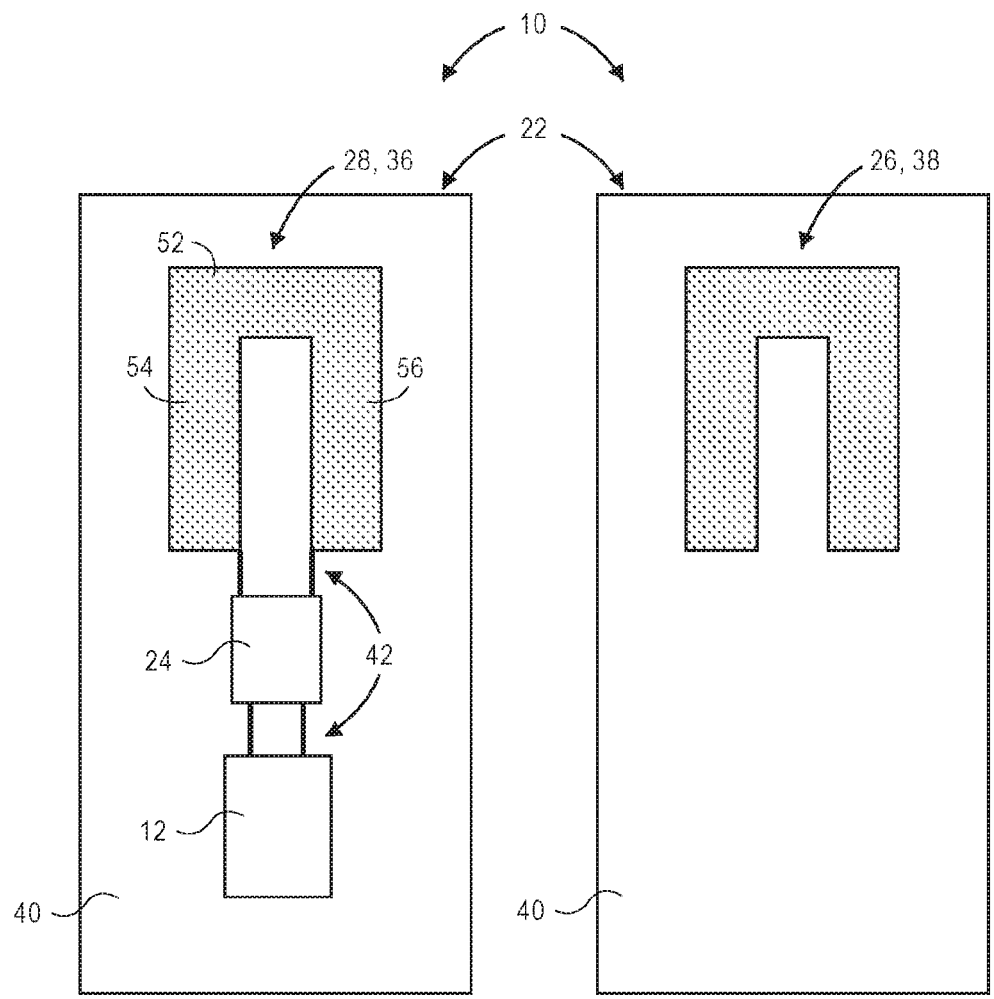
FIG. 1 is a top view of an antenna assembly constructed in accordance with various embodiments of the current invention.
FIG. 2 is a bottom view of the antenna assembly of FIG. 1.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

An antenna assembly 10, constructed in accordance with various embodiments of the current invention, is shown in FIGS. 1-4. The antenna assembly 10, in combination with a wireless transceiver module 12, is intended to provide wireless data communication with an electric motor assembly 14 of an appliance; a heating, ventilation, and air conditioning (HVAC) system; or the like. The electric motor assembly 14 may comprise a housing 16, an electric motor 18, and a motor controller 20. The antenna assembly 10 and the wireless transceiver module 12 may allow handheld electronic devices and/or networked computing devices to program functionality, update settings, and so forth, for the electric motor 18. The antenna assembly 10 may broadly comprise a substrate 22, an impedance matching network 24, a parasitic antenna element 26, and a driven antenna element 28.

The wireless transceiver module 12 may include a transmitter and a receiver with signal and/or data transmitting and receiving circuits, such as amplifiers, filters, mixers, oscillators, digital signal processors (DSPs), and the like, and combinations thereof. The wireless transceiver module 12 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.15.4 standards such as ZigBee®, IEEE 802.16 standard such as WiMAX, Bluetooth™, Bluetooth low energy (LE)™, industrial, scientific, or medical (ISM), or combinations thereof. An exemplary wireless transceiver module 12 may operate at frequencies around 2.4 gigahertz (GHz) or between approximately 2.4 GHz and approximately 2.5 GHz.

The wireless transceiver module 12 may act as a bidirectional communication component between the motor controller 20 and the impedance matching network 24. In a first direction, the wireless transceiver module 12 may receive an RF signal from the impedance matching network 24 and may decode and/or demodulate the RF signal into data and/or signals, which it transmits to the motor controller 20. The data and/or signals may include settings or operating parameters, such as speed profiles, etc., which determine or control the operation or performance of the electric motor 18. In a second direction, the wireless transceiver module 12 may receive data and/or signals from the motor controller 20. The wireless transceiver module 12 may then encode and/or modulate the data and/or signals into the RF signal, which it transmits to the impedance matching network 24. The RF signal may be an unbalanced signal, which includes a varying electric voltage or current signal and ground.

The wireless transceiver module 12 may be implemented as one or more integrated circuits that are packaged in a single package which is mounted on the substrate 22. Typically, the wireless transceiver module 12 is packaged in a surface mount package such as a leadless chip carrier (LCC), a ball grid array (BGA) or the like, although a through-hole package, such as a pin grid array (PGA) or the like, is also possible.

Figure 5:
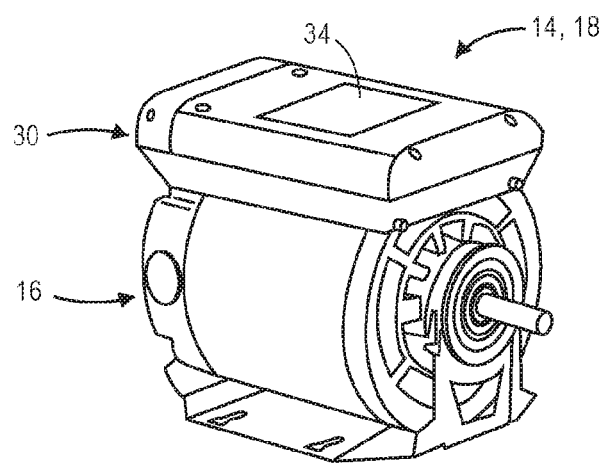
FIG. 5 is a perspective view of an electric motor assembly including an electric motor for which the antenna assembly may provide wireless communication.
Figure 6:
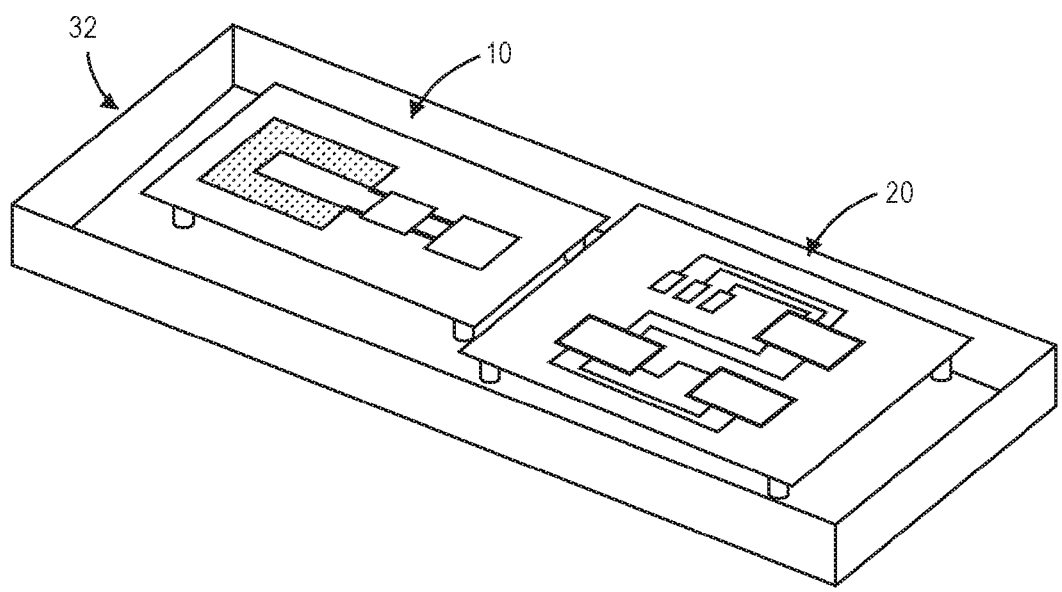
FIG. 6 is a perspective view of the antenna assembly and a substrate retaining the motor controller positioned in a box which is retained within a housing for the electric motor.

The housing 16 may house the electric motor 18 and may be formed from metals such as iron, aluminum, copper, titanium, nickel, etc., or alloys such as steel and the like. The housing 16 may include an electronic circuitry chamber 30, as shown in FIG. 5, in which the motor controller 20 and the antenna assembly 10 are located. The housing 16 may further include a box 32 or tray which retains the motor controller 20 and the antenna assembly 10. In various embodiments, the antenna assembly 10 and the wireless transceiver module 12 are implemented on the substrate 22, described in more detail below, while the motor controller 20 may be implemented on a separate substrate. The box 32 may include a bottom wall and four side walls, each formed from metal. In some embodiments, the substrates may be positioned adjacent one another, as shown in FIG. 6. In other embodiments, the substrates may be stacked one on another. The electronic circuitry chamber 30 may also include a window 34 through which at least the antenna assembly 10 is visible.

The electric motor 18 generally provides mechanical rotation that may be utilized in HVAC blowers and appliances such as washing machines, clothes dryers, dishwashers, water pumps, and so forth. The electric motor 18 may be embodied by various types of motors such as alternating current (AC) motors, direct current (DC) motors, universal motors, permanent magnet motors, etc. The electric motor 18 may receive the control signals from the motor controller 20.

The motor controller 20 may include electronic circuitry to provide control of the electric motor 18. The electronic circuitry may include processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The electronic circuitry may also include read-only memory (ROM), programmable ROM, erasable programmable ROM, random-access memory (RAM) such as static RAM (SRAM) or dynamic RAM (DRAM), cache memory, or the like, or combinations thereof. The motor controller 20 may further include analog and digital electronic components that provide controlling functions such as proportional, integral, or derivative control or combinations thereof. The motor controller 20 may generate one or more control signals to the electric motor 18 components which control parameters such as the speed and/or braking of a rotor or drive shaft of the motor 18.

The substrate 22 generally provides an electrical connection foundation for the wireless transceiver module 12, the impedance matching network 24, and the driven antenna element 28. The substrate 22 may include one or more insulating or dielectric layers and one or more electrically conductive layers. The substrate 22 may be embodied by a printed circuit board with rigid insulating layers formed from non-conductive material that includes various combinations of glass epoxy, fiberglass, woven glass, matte glass, cotton paper, phenolic cotton paper, polyester, epoxies, epoxy resins, FR4, and the like. The substrate 22 may also be embodied by a flexible circuit (flex) with flexible insulating layers formed from polymers such as polyether ether ketone, polyimide, polyester, and the like. The electrically conductive layers are typically formed from copper, although other metals such as nickel, aluminum, gold, silver, palladium, zinc, tin, lead, etc. may be used. Alternatively, the electrically conductive layers may be formed from conductive ink. An exemplary substrate may include, at the least, a first electrically conductive layer 36, a second electrically conductive layer 38, and an insulating layer 40. The first electrically conductive layer 36 may be disposed on, or laminated to, a top surface of the insulating layer 40, while the second electrically conductive layer 38 may be disposed on, or laminated to, a bottom surface of the insulating layer 40. The substrate 22 may further include a plurality of electrically conductive traces 42 formed from the first and second electrically conductive layers 36, 38. Thus, the electrically conductive traces 42 may be disposed on the upper and lower surfaces of the insulating layer 40. The electrically conductive traces 42 may provide electrical connection between for the wireless transceiver module 12, the impedance matching network 24, and the driven antenna element 28.

The wireless transceiver module 12, the impedance matching network 24, the parasitic antenna element 26, and the driven antenna element 28 may all be mounted on, or retained on, the substrate 22. The parasitic antenna element 26 and the driven antenna element 28 may be mounted on a first section, region, or area of the substrate 22, while the wireless transceiver module 12 and the impedance matching network 24 may be mounted on a second section, region, or area of the substrate 22, separate from the first section. The first section may only include the first and second conductive layers 36, 38 and the insulating layer 40. The second section may be a multilayer board, which includes the first and second conductive layers 36, 38 and the insulating layer 40 as well as a plurality of inner insulating layers and inner electrically conductive layers, with the insulating layers and the electrically conductive layers being interleaved with one another. The second section of the substrate 22 may include electrical power planes, electrical ground planes, plated through hole vias, blind vias, buried vias, and the like, and combinations thereof.

Figure 3:
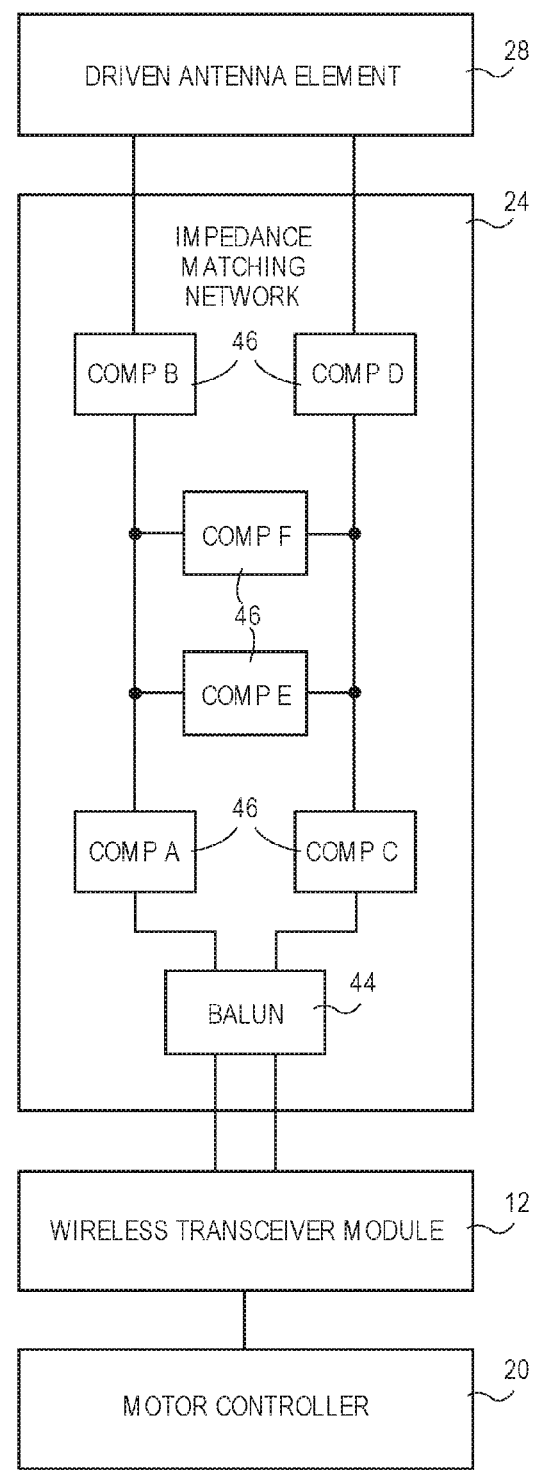
FIG. 3 is a block schematic diagram illustrating some of the electrical connections of the components of the antenna assembly, the wireless transceiver module, and a motor controller.

The impedance matching network 24, as seen in FIG. 3, generally provides electrical impedance matching between two impedance mismatched components—typically including a driver and a driven element, such as the output of the transmitter of the wireless transceiver module 12 and the driven antenna element 28. The impedance matching network 24 may include a balun 44 and a plurality of components 46.

The balun 44 generally provides bidirectional conversion from a balanced electronic signal to an unbalanced electronic signal and vice-versa. The balun 44 may include transformers, toroidal cores, inductors, coils, resistors, or the like, or combinations thereof. The balun 44 may receive an unbalanced signal from an output of the wireless transceiver module 12, which is the RF signal discussed above, and may convert the unbalanced signal to a balanced signal which is provided to the other components of the impedance matching network 24. The balanced signal may include a first complementary signal, which is a varying electric voltage or current, and a second complementary signal, also a varying electric voltage or current, that is an inversion or negative of the first complementary signal. In various embodiments, the balanced signal may be a differential signal. Additionally, the balun 44 may receive the balanced signal from the other components of the impedance matching network 24 and may convert the balanced signal to the unbalanced signal which is provided to the wireless transceiver module 12. The balun 44 may also provide additional impedance matching between the wireless transceiver module 12 and the driven antenna element 28. The balun 44 may include first and second unbalanced ports, electrically connected to the wireless transceiver module 12, and first and second balanced ports, electrically connected to variable components 46 discussed in more detail below.

The components 46 may include a first component 46A, a second component 46B, a third component 46C, a fourth component 46D, a fifth component 46E, and a sixth component 46F. Each component 46A-F may be a two terminal device with an electrical function, characteristic, or parameter which varies according to a particular embodiment and may be implemented as a resistor, a capacitor, an inductor, an open circuit, or a short circuit. With reference to FIG. 3, the first and second components 46A, 46B may be electrically connected in series with one another, and the first component 46A may also be electrically connected to one of the balanced outputs of the balun 44. The third and fourth components 46C, 46D may be electrically connected in series with one another, and the third component 46C may also be electrically connected to the other of the balanced outputs of the balun 44. The fifth and sixth components 46E, 46F may each have a first terminal electrically connected to the series connection between the first and second components 46A, 46B and a second terminal electrically connected to the series connection between the third and fourth components 46C, 46D. The fifth and sixth components 46E, 46F may be electrically connected in parallel to one another. The impedance matching network 24 may have a first balanced port at the free terminal of the second component 46B which transmits and receives the first complementary signal and a second balanced port at the free terminal of the fourth component 46D which transmits and receives the second complementary signal.

In exemplary embodiments, the first, second, third, and fourth variable components 46A-D may be each implemented as a resistor. And, the fifth and sixth variable components 46E, 46F may be implemented as open circuits.

Figure 4:
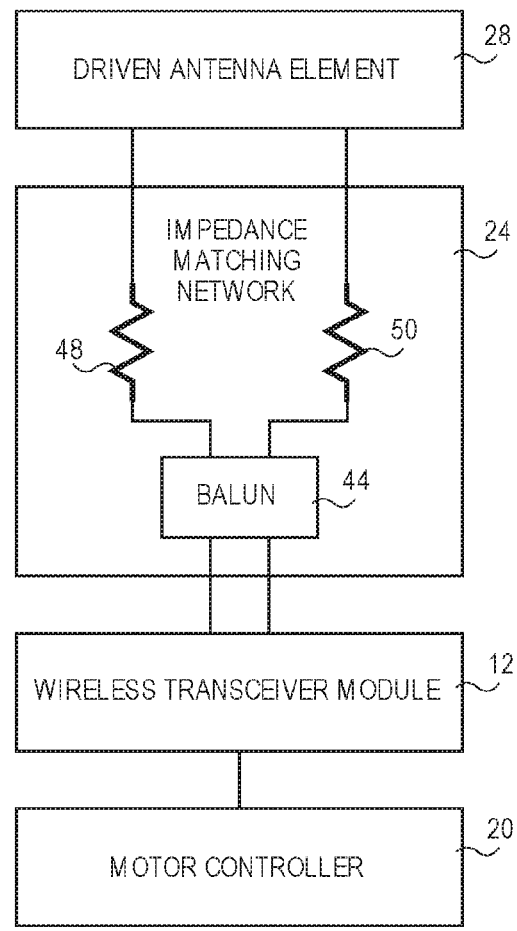
FIG. 4 is a block schematic diagram illustrating some of the electrical connections of an alternative embodiment of the antenna assembly along with the wireless transceiver module, and the motor controller.

In other embodiments, the impedance matching network 24 may include the balun 44, a first resistor 48, and a second resistor 50, as shown in FIG. 4. Each resistor 48, 50 includes first and second terminals. The first terminal of the first resistor 48 may be electrically connected to the first balanced port of the balun 44, while the first terminal of the second resistor 50 may be electrically connected to the second balanced port. The second terminal of the first resistor 48 and the second terminal of the second resistor 50 may form first and second balanced ports, respectively, of the impedance matching network 24. In exemplary embodiments, the first and second resistors 48, 50 may be surface mount device (SMD) resistors.

The driven antenna element 28 may be formed from the first electrically conductive layer 36 of the substrate 22 and thus may be disposed on, or laminated to, the top surface of the insulating layer 40. The driven antenna element 28 may be of a notch antenna type and may include a body 52, a first arm 54, and a second arm 56. The first and second arms 54, 56 may be spaced apart from one another, parallel to one another, and may physically connect to opposing ends of the body 52, extending orthogonally therefrom. In exemplary embodiments as shown in FIG. 1, the body 52 and the first and second arms 54, 56 may each be elongated and have a roughly rectangular shape. In other embodiments, the first and second arms 54, 56 may be roughly rectangular, while the body 52 has a rounded, crescent shape to give the driven antenna element 28 a U shape. The first balanced port from the impedance matching network 24 may be electrically connected to the free end of the first arm 54 so that the first arm 54 transmits and receives the first complementary signal, and the second balanced port from the impedance matching network 24 may be electrically connected to the free end of the second arm 56 so that the second arm 56 transmits and receives the second complementary signal. In exemplary embodiments, the second terminal of the first resistor 48 may be electrically connected, or soldered, to the free end of the first arm 54, and the second terminal of the second resistor 50 may be soldered to the free end of the second arm 56. The driven antenna element 28 may generate radio waves in response to receiving the balanced signal from the impedance matching network 24. Additionally, the driven antenna element 28 may generate the balanced signal in response to receiving radio waves.

The parasitic antenna element 26 may be formed from the second electrically conductive layer 38 of the substrate 22 and thus may be disposed on, or laminated to, the bottom surface of the insulating layer 40, as seen in FIG. 2. The parasitic antenna element 26 may be substantially identical to the driven antenna element 28 in shape and dimension (with a body, a first arm, and a second arm), and may be positioned on the bottom surface in direct alignment with the driven antenna element 28 on the top surface. The parasitic antenna element 26 is generally not electrically connected to any other component and provides passive radiation of the radio waves from the driven antenna element 28 as a reflector or a director. In some embodiments, the parasitic antenna element 26 is optional. In other embodiments, the parasitic antenna element 26 may be formed from electrically conductive material disposed on, or laminated to, a surface of an insulating layer of a separate substrate. In such embodiments, the parasitic antenna element 26 may be positioned in the vicinity of the driven antenna element 28, perhaps basically aligned with the driven antenna element 28 but spaced apart therefrom.

Embodiments of the antenna assembly 10 may interface with the wireless transceiver module 12 to provide wireless communication with the motor controller 20 controlling the operation of the electric motor 18. A technician may utilize a portable electronic device, such as a smartphone, a tablet, a laptop computer, or the like, to communicate with the motor controller 20 through protocols such as Bluetooth™ and WiFi. The technician may change settings of the electric motor 18, such as speed profiles, or read the current status or a status history. The antenna assembly 10 provides good signal transmission and reception range even in close proximity to metal objects, such as the walls of the box 32 in which the antenna assembly 10 is retained. The antenna assembly 10 may still operate properly when the driven antenna element 28 is positioned approximately 0.5 inches from the metal bottom wall of the box 32 and/or when the driven antenna element 28 is positioned approximately 0.5 inches from one or more of the metal side walls.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An antenna assembly for an electric motor assembly of an appliance, the antenna assembly comprising:
   a substrate including an insulating layer and a first electrically conductive layer disposed on a top surface of the insulating layer;
   an impedance matching network configured to match an electrical impedance between two impedance mismatched components, the impedance matching network including
      a balun configured to convert a first unbalanced signal to a first balanced signal and convert a second balanced signal to a second unbalanced signal, the balun including a unbalanced port to communicate the first and second unbalanced signals and a balanced port to communicate the first and second balanced signals,
      a first resistor including a first terminal and a second terminal, the first terminal electrically connected to a first terminal of the balanced port, and
      a second resistor including a first terminal and a second terminal, the first terminal electrically connected to a second terminal of the balanced port; and
   a driven antenna element formed from the first electrically conductive layer and disposed on the top surface of the insulating layer, the driven antenna element including a body, a first arm, and a second arm, the first and second arms spaced apart from another, parallel to one another, and physically connected to opposing ends of the body, the first arm electrically connected to the second terminal of the first resistor, and the second arm electrically connected to the second terminal of the second resistor.

2. The antenna assembly of claim 1, further comprising a second electrically conductive layer disposed on a bottom surface of the insulating layer, and
   a parasitic antenna element formed from the second electrically conductive layer, the parasitic antenna element including a body, a first arm, and a second arm that are identical in shape and dimension to the body, the first arm, and the second arm, respectively, of the driven antenna element, the parasitic antenna element being disposed on the bottom surface of the insulating layer in alignment with the driven antenna element.

3. The antenna assembly of claim 1, wherein the second terminal of the first resistor is electrically connected to an end of the first arm opposite the body and the second terminal of the second resistor is electrically connected to an end of the second arm opposite the body.

4. The antenna assembly of claim 1, wherein the first and second resistors are surface mount devices and the second terminal of the first resistor is soldered to an end of the first arm opposite the body and the second terminal of the second resistor is soldered to an end of the second arm opposite the body.

5. The antenna assembly of claim 1, wherein the substrate is a printed circuit board.

6. The antenna assembly of claim 1, wherein the substrate is a flexible circuit.

7. An antenna assembly for an electric motor assembly of an appliance, the antenna assembly comprising:
   a printed circuit board including an insulating layer, a first electrically conductive layer disposed on a top surface of the insulating layer, and a second electrically conductive layer disposed on a bottom surface of the insulating layer;
   an impedance matching network configured to match an electrical impedance between two impedance mismatched components, the impedance matching network including
      a balun configured to convert a first unbalanced signal to a first balanced signal and convert a second balanced signal to a second unbalanced signal, the balun including a unbalanced port to communicate the first and second unbalanced signals and a balanced port to communicate the first and second balanced signals,
      a first resistor including a first terminal and a second terminal, the first terminal electrically connected to a first terminal of the balanced port, and
      a second resistor including a first terminal and a second terminal, the first terminal electrically connected to a second terminal of the balanced port;
   a driven antenna element formed from the first electrically conductive layer and disposed on the top surface of the insulating layer, the driven antenna element including a body, a first arm, and a second arm, the first and second arms spaced apart from another, parallel to one another, and physically connected to opposing ends of the body, the first arm electrically connected to the second terminal of the first resistor, and the second arm electrically connected to the second terminal of the second resistor; and
   a parasitic antenna element formed from the second electrically conductive layer, the parasitic antenna element including a body, a first arm, and a second arm that are identical in shape and dimension to the body, the first arm, and the second arm, respectively, of the driven antenna element, the parasitic antenna element being disposed on the bottom surface of the insulating layer in alignment with the driven antenna element.

8. The antenna assembly of claim 7, wherein the second terminal of the first resistor is electrically connected to an end of the first arm opposite the body and the second terminal of the second resistor is electrically connected to an end of the second arm opposite the body.

9. The antenna assembly of claim 7, wherein the first and second resistors are surface mount devices and the second terminal of the first resistor is soldered to an end of the first arm opposite the body and the second terminal of the second resistor is soldered to an end of the second arm opposite the body.

10. An electric motor assembly comprising:
    a housing including at least one wall formed from metal;
    an electric motor retained within the housing;
    a motor controller configured to control operation of the electric motor;
    a wireless transceiver module configured to receive data from the motor controller and transmit the data in a first unbalanced signal and to receive data in a second unbalanced signal and transmit the data to the motor controller; and
    an antenna assembly including
       a substrate including an insulating layer and a first electrically conductive layer disposed on a top surface of the insulating layer,
       an impedance matching network configured to match an electrical impedance between two impedance mismatched components, the impedance matching network including
          a balun configured to convert the first unbalanced signal from the wireless transceiver module to a first balanced signal and convert a second balanced signal to the second unbalanced signal for the wireless transceiver module, the balun including an unbalanced port to communicate the first and second unbalanced signals and a balanced port to communicate the first and second balanced signals,
          a first resistor including a first terminal and a second terminal, the first terminal electrically connected to a first terminal of the balanced port, and
          a second resistor including a first terminal and a second terminal, the first terminal electrically connected to a second terminal of the balanced port, and
       a driven antenna element formed from the first electrically conductive layer and disposed on the top surface of the insulating layer, the driven antenna element positioned in proximity to the at least one wall of the housing.

11. The electric motor assembly of claim 10, wherein the driven antenna element includes a body, a first arm, and a second arm, the first and second arms spaced apart from another, parallel to one another, and physically connected to opposing ends of the body, the first arm electrically connected to the second terminal of the first resistor, and the second arm electrically connected to the second terminal of the second resistor.

12. The electric motor assembly of claim 11, wherein the antenna assembly further includes
    a second electrically conductive layer disposed on a bottom surface of the insulating layer, and
    a parasitic antenna element formed from the second electrically conductive layer, the parasitic antenna element including a body, a first arm, and a second arm that are identical in shape and dimension to the body, the first arm, and the second arm, respectively, of the driven antenna element, the parasitic antenna element being disposed on the bottom surface of the insulating layer in alignment with the driven antenna element.

13. The electric motor assembly of claim 11, wherein the second terminal of the first resistor is electrically connected to an end of the first arm opposite the body and the second terminal of the second resistor is electrically connected to an end of the second arm opposite the body.

14. The electric motor assembly of claim 11, wherein the first and second resistors are surface mount devices and the second terminal of the first resistor is soldered to an end of the first arm opposite the body and the second terminal of the second resistor is soldered to an end of the second arm opposite the body.

15. The electric motor assembly of claim 10, wherein the substrate is a printed circuit board.

16. The electric motor assembly of claim 10, wherein the substrate is a flexible circuit.

17. The electric motor assembly of claim 10, wherein the driven antenna element is positioned approximately 0.5 inches from the at least one wall of the housing.

\* \* \* \* \*